United States Patent [19]

Duquenne et al.

[11] 4,141,547

[45] Feb. 27, 1979

[54] MAGNETIC CONTROL CLOSURE SYSTEM

[75] Inventors: Claude E. D. Duquenne, La Garenne; Joseph Plotkowiak, Carrieres sur Seine, both of France

[73] Assignee: Societe Nationale d'Etude et de Construction de Moteurs d'Aviation, Paris, France

[21] Appl. No.: 815,281

[22] Filed: Jul. 13, 1977

[30] Foreign Application Priority Data

Jul. 20, 1976 [FR] France .................................. 76 22785

[51] Int. Cl.$^2$ ................................................ F16J 9/00
[52] U.S. Cl. .................................................... 277/80
[58] Field of Search ........................................ 277/80

[56] References Cited

U.S. PATENT DOCUMENTS 3,931,976  1/1976  Duquenne .............................. 277/80

Primary Examiner—Robert I. Smith
Attorney, Agent, or Firm—Cameron, Kerkam, Sutton, Stowell and Stowell

[57] ABSTRACT

An annular seal is clamped in the active position of closure between stationary knife-edges on the rotor of a rotating machine and movable knife-edges of a support member which can be displaced between an active position of magnetic coupling with the rotor and an inactive position of withdrawal from the rotor. The magnetic means have a second stable state of attraction in which the movable support member remains separated from the rotor in the inactive position.

6 Claims, 7 Drawing Figures

MAGNETIC CONTROL CLOSURE SYSTEM

This invention relates to a magnetic-control closure system for achieving leak-tightness between a driving element and a driven element connected together by separable coupling means and constitutes an improvement in the arrangements described in U.S. Pat. No. 3,931,976 in which the driving element is a compressor rotor for special gases, especially for toxic or hazardous gases.

In one design which is already known, a closure system of this type is constituted by an annular seal olocated in a plane at right angles to the axis of rotation of the motor, said seal being clamped in the active position of closure between on the one hand stationary knife-edges formed on the rotor for this purpose and on the other hand movable knife-edges carried by a support member which is capable of moving along the axis of the machine under the action of control means between the active position in which the support member is urged towards the rotor and an inactive position of closure in which said support member remains separated from this latter.

U.S. Pat. No. 3,931,976 cited earlier proposed closure control means in which the member which supports the annular seal undergoes a displacement between the inactive position and the active position under the action of magnetic means. In particular and in accordance with the invention described in this patent, the movable knife-edges are connected to the movable support member by elastic means which exert a closure force in the direction of the stationary knife-edges, the value of said force being lower than the force of magnetic attraction.

In the active position of closure, the member which supports the annular seal therefore rests under the action of its own weight on the frame of the machine to which it is locked. When the rotor is in motion, there is therefore a potential danger of displacement of the support member and accidental closure of the closure system as a result either of vibrations or of pressure differences on each side of the leak-tight packing mounted between the rotor and the casing of the machine.

The aim of the present invention is to overcome this disadvantage. To this end, the magnetic attraction means employed for the displacement of the annular support member from the inactive position to the active position have a second stable state of attraction in which the support member is maintained at a distance from the rotor.

In accordance with a preferred embodiment of the invention, the magnetic attraction means cooperate in the inactive position of closure with a pole-piece which is rigidly fixed to the frame of the machine.

For the practical application of the present invention, it is an advantage to make use of the magnetic attraction means which have two stable states such as those described, for example, in French patent application No. 76 14569 filed on May 14, 1976 by the company known as "Le Materiel Magnetique".

The invention will in any case be explained in greater detail in the complementary description given below, reference being made to the accompanying drawings in which one example of construction is given by way of indication without any limitation being implied, and in which.

Figure 1:
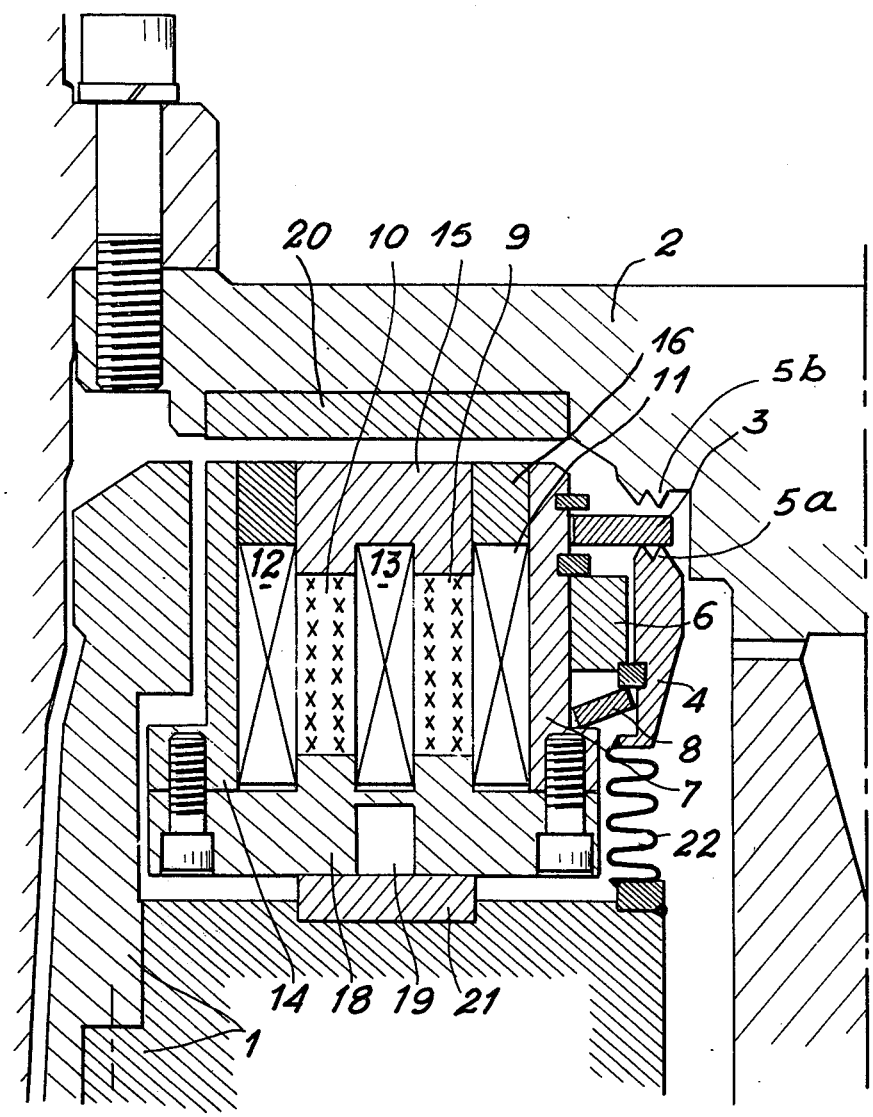
FIG. 1 is an axial half-sectional view of a closure system in accordance with the invention.

The closure system illustrated in the diagrammatic half-sectional view of FIG. 1 is shown in the inactive position of closure. Leak-tightness between the frame 1 and the rotor 2 is ensured by means of dynamic seals (not shown in the drawings), the constructional detail of which has little bearing on the invention. The annular seal 3 rests on knife-edges 5a carried by an annular support member 4 and remains at a distance from other knife-edges 5b which are integral with the rotor 2 of the machine.

The annular support member 4 is capable of axial displacement with respect to the body of the closure control device hereinafter designated as a "magnetic suction unit". In the inactive position of closure, said support member 4 is abuttingly applied against a retaining ring 6 which is rigidly fixed to the inner body 7 of the magnetic suction unit, said member being maintained in this position by means of an elastic washer 8 which is applied against the body 7. The magnetic suction unit is constituted by a pair of concentric rings 9 and 10 of permanent magnets, said rings being placed between windings 11, 12, 13 and by an armature made up of several parts, namely of the inner body 7, an outer body 14 and an intermediate body 15 which are separated by non-magnetic elements 16 and 17 and of a bottom portion 18 having a non-magnetic zone 19. The non-magnetic elements can be of stainless steel, for example. Two pole-pieces 20 and 21 are rigidly fixed to the rotor 2 and to the frame 1 respectively by suitable means.

In the inactive position of closure, the bottom portion 18 of the magnetic suction unit rests on the pole-piece 21 and is maintained in position by the magnetic force of attraction in order to prevent any accidental displacement.

When the rotor is at a standstill, the magnetic suction unit can be actuated so as to be applied in contact with the pole-pieces 20. The attractive force must be sufficient to overcome the force produced by the washer 8 which is compressed under the action of the displacement of the support member 4 as this latter applies the seal 3 against the knife-edges of the rotor 2. In this active position of closure, the surrounding medium is isolated from the rotor compartment on the one hand by means of the seal 3 and on the other hand by means of a bellows seal 22 which connects the support member 4 to the frame 1.

The different stages of operation of the magnetic suction until will now be explained in detail with reference to FIG. 2. The suction unit shown in FIG. 2a rests on the pole-piece 21 by means of its lower portion 18. The magnets 9 and 10 are magnetized in opposite directions and the flux passes through the pole-piece 21 and the intermediate body 15, with the result that an attractive force exists between the suction unit and the pole-piece 21, thus achieving a stable state of attraction. For reasons of construction and leak-tightness, a portion of armature can remain between the coil 13 and the non-magnetic portion 19 so as to cause deviation of a very small quantity of flux.

Figure 2A:
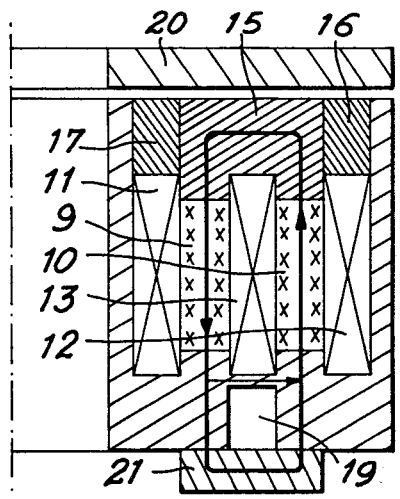
FIGS. 2a to 2d are a diagram of the cycle of operation of the magnetic attraction means employed for the practical application of the present invention.
Figure 2B:
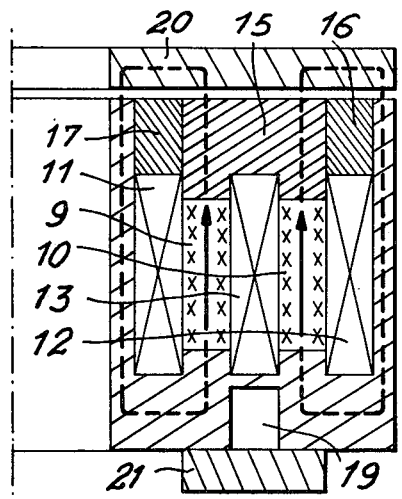
Figure 2C:
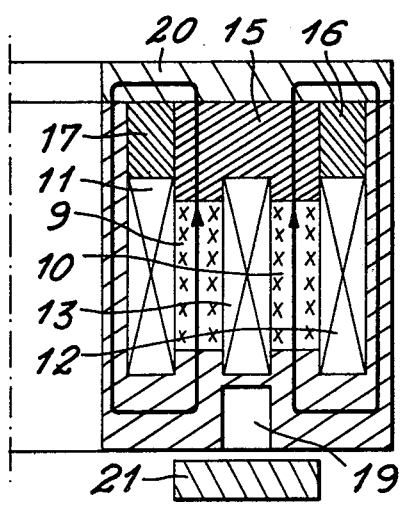

FIG. 2b illustrates the suction unit in the unstable position, a current pulse of very short duration having been delivered into the windings 11 and 12 in order to magnetize the two magnets 9 and 10 in the same direction. Under these conditions, an attractive force is exerted between the suction unit and the pole-piece 20 through the armatures while passing around the non-magnetic members 16 and 17. The suction unit moves and takes up a position shown in FIG. 2c. This attractive force must be sufficient to overcome the force produced by the elastic washer 8 which applies the annular seal against the knife-edges 5b of the rotor 2 by means of the support member 4. FIG. 2c show the suction unit which is rigidly fixed to the pole-piece 20 and separated from the pole-piece 21, thus corresponding to a second stable state.

Figure 2D:
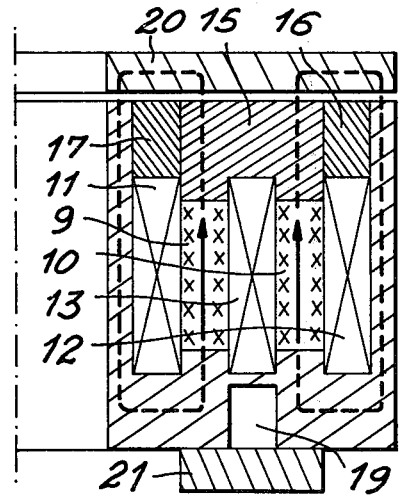

In order to bring the suction unit onto the pole-piece 21, it is necessary to reduce the attractive force exerted between the suction unit and the pole-piece 20. To this end, there is applied to the windings 11 and 12 in the form of pulses a weaker current of opposite direction to the current employed at the time of magnetization in order to produce demagnetization and reversal of the residual magnetism. When the attractive force becomes lower in value than the force produced by the elastic washer 8 which is added the weight of the suction unit, this latter rests on the pole-piece 21 as shown in FIG. 2d.

The direction of magnetization of the magnets is reversed by the winding 13 and the flux thus passes through the intermediate armature 15 of the suction unit and the pole-piece 21 in order to revert to the initial stable state shown in FIG. 2a.

A generator which is capable of delivering pulses of very short duration and employed for example the discharge of a bank of capacitors is capable of supplying the suction unit through switching devices (not shown in the drawings) for reversing the direction of the current within the windings 11 and 12.

Figure 3:
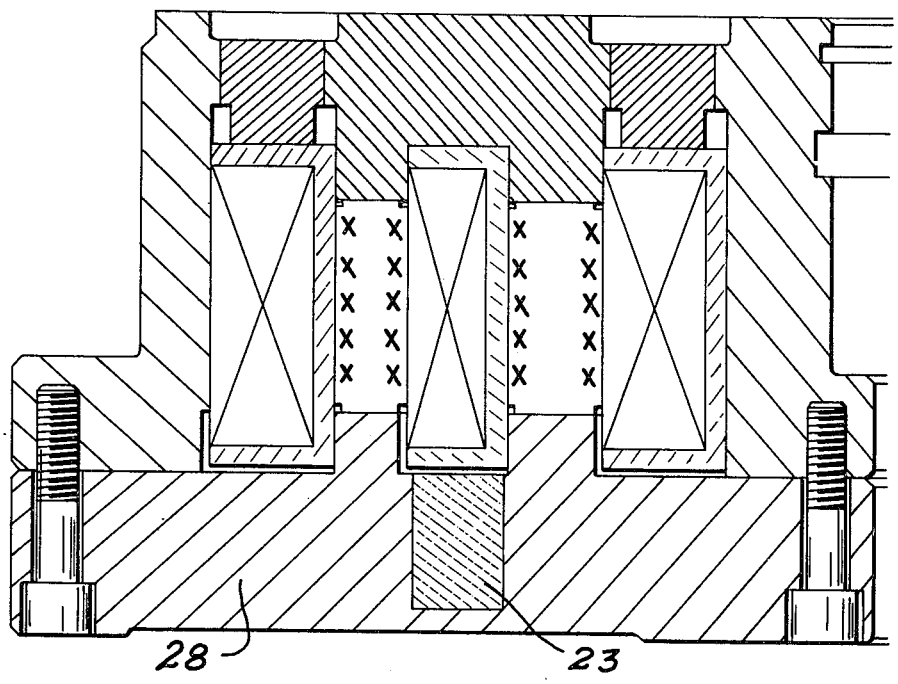
FIGS. 3 and 4 are axial half-sectional views of particular forms of construction of the magnetic circuit on that side in which magnetic attraction takes place towards the frame of the machine.
Figure 4:
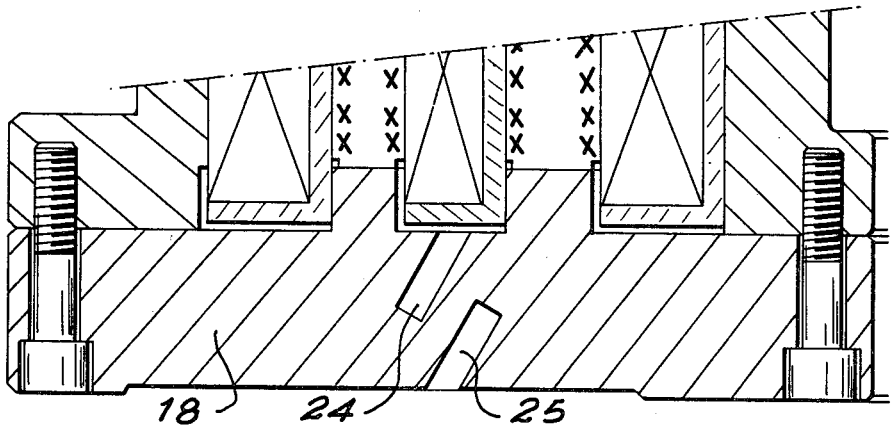

FIGS. 3 and 4 illustrate two different means for obtaining magnetic decoupling in the bottom portion 18 of the suction unit.

FIG. 3 shows an advantageous arrangement in which this bottom portion has an annular groove in which a non-magnetic material 23 can be placed, said material being secured therein by any suitable means such as welding or glueing, for example, This arrangement makes it possible to maintain leak-tightness between the interior and the exterior of the suction unit in order to protect the windings by creating a barrier for the magnetic flux.

As shown in FIG. 4, two frusto-conical annular grooves 24 and 25 ensure magnetic decoupling while making it possible to maintain leak-tightness as well as a certain degree of rigidity in the bottom portion 18.

The device hereinabove described applies in all cases in which leak-tightness has to be ensured in a reliable manner, especially in the sealing devices employed in units for enrichment of uranium by gaseous diffusion. In order to carry out inspection or overhaul in this case, the drive motor of each power-driven compressor and the motor bearings must be uncoupled without thereby draining the compartment which contains the compressor and the toxic gas.

What we claim is:

1. A closure system for the rotor of a rotating machine for conveying a toxic fluid comprising an annular seal in a plane at right angles to the axis of rotation of the machine, said seal being clamped in an active position between stationary knife-edges on the rotor and movable knife-edges carried by an annular support member moving along the axis of the machine, the movable support member being displaced by magnetic means between an inactive position in which said member is separated from the rotor and the active position in which said member is coupled to the rotor as a result of magnetic forces of attraction, and the magnetic means having a second stable state of attraction in which the movable support member is maintained at a distance from the rotor in the inactive position and wherein the magnetic means exhibit symmetry of revolution and have two windings, one winding having two coils in series on each side of two annular permanent magnets, the other winding being a coil between the two permanent magnets for demagnetization and reversal of the residual magnetism of one of the permanent magnets.

2. A closure system according to claim 1, wherein the magnetic means cooperate in the inactive position with a pole-piece rigidly fixed to a frame of the machine.

3. A closure system according to claim 2, wherein the magnetic means includes a non-magnetic barrier to the magnetic flux on the side corresponding to attraction in the direction of the frame.

4. A closure system according to claim 3, wherein the barrier to the magnetic flux is a cylindrical groove in the armature.

5. A closure system according to claim 3, wherein the barrier to the magnetic flux is two frusto-conical annular grooves in the armature, one groove being on the same side as the pole-piece and the other groove being on the same side as the reversing coil.

6. A closure system according to claim 3, wherein the barrier to the magnetic flux is a ring of non-magnetic material in the armature.

* * * * *